US012163463B2

(12) United States Patent
Watanabe

(10) Patent No.: US 12,163,463 B2

(45) Date of Patent: Dec. 10, 2024

(54) OUTBOARD MOTOR, ENGINE STARTING SYSTEM, AND WATERCRAFT PROPULSION SYSTEM

(71) Applicant: YAMAHA HATSUDOKI KABUSHIKI KAISHA, Iwata (JP)

(72) Inventor: Masahisa Watanabe, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 18/137,619

(22) Filed: Apr. 21, 2023

(65) Prior Publication Data

US 2023/0340903 A1 Oct. 26, 2023

(30) Foreign Application Priority Data

Apr. 22, 2022 (JP) ................................ 2022-071146

(51) Int. Cl.

*F02B 61/04* (2006.01)

*F02N 11/08* (2006.01)

*B63H 20/00* (2006.01)

(52) U.S. Cl.

CPC ........ *F02B 61/045* (2013.01); *F02N 11/0862* (2013.01); *B63H 2020/003* (2013.01)

(58) Field of Classification Search

CPC ........ F02B 61/04; F02B 61/045; F02N 11/08; F02N 11/0862; B63H 21/14; B63H 21/21; B63H 21/213; B63H 21/24; H02P 9/02; H02P 9/48

See application file for complete search history.

(56) References Cited

U.S. PATENT DOCUMENTS

| | | | | |
|---|---|---|---|---|
| 11,661,165 | B1 * | 5/2023 | Gonring | B63H 21/14 701/21 |
| 2009/0014220 | A1 * | 1/2009 | Ishizeki | F02N 11/0814 180/54.1 |
| 2009/0061705 | A1 * | 3/2009 | Wiatrowski | F02N 11/0862 440/85 |
| 2019/0039707 | A1 * | 2/2019 | Ezaki | H02J 3/241 |
| 2019/0311553 | A1 * | 10/2019 | Kawase | B63B 79/10 |
| 2020/0182216 | A1 * | 6/2020 | Yoshikawa | F16H 59/105 |
| 2022/0081089 | A1 * | 3/2022 | Watanabe | B63H 20/32 |
| 2023/0102266 | A1 * | 3/2023 | Crain | F02P 9/002 701/113 |

FOREIGN PATENT DOCUMENTS

| | | |
|---|---|---|
| JP | 2017-106370 A | 6/2017 |

* cited by examiner

*Primary Examiner* — Carl C Staubach

*Assistant Examiner* — Johnny H Hoang

(74) *Attorney, Agent, or Firm* — Keating & Bennett, LLP

(57) ABSTRACT

An outboard motor includes an engine, a propeller to generate a propulsive force by the drive force of the engine, a lithium ion capacitor, a starter motor to be actuated by a power supply from the lithium ion capacitor to crank the engine, a starter relay provided on a starting power supply line between the lithium ion capacitor and the starter motor, a start switch to be turned on by an engine starting operation by a user to energize a coil of the starter relay from the lithium ion capacitor so as to turn on the starter relay, and a charging controller including a switch to connect the lithium ion capacitor to a charging power source to charge the lithium ion capacitor during the driving of the engine, and to disconnect the lithium ion capacitor from the charging power source when the driving of the engine is stopped.

14 Claims, 6 Drawing Sheets

OUTBOARD MOTOR, ENGINE STARTING SYSTEM, AND WATERCRAFT PROPULSION SYSTEM

CROSS REFERENCE TO RELATED APPLICATIONS

This application claims the benefit of priority to Japanese Patent Application No. 2022-071146 filed on Apr. 22, 2022. The entire contents of this application are hereby incorporated herein by reference.

BACKGROUND OF THE INVENTION

1. Field of the Invention

The present invention relates to an outboard motor, an engine starting system, and a watercraft propulsion system.

2. Description of the Related Art

An outboard motor is an example of a watercraft propulsion system, and a watercraft including an outboard motor attached to its hull is referred to as an outboard motor watercraft. An engine-driven type outboard motor as described in US 2019/0311553 A1 requires a battery such as a lead battery to start its engine. The battery is disposed on the hull, and is connected to the outboard motor by a power supply cable. Where a plurality of outboard motors are attached to the hull, the same number of batteries as that of the outboard motors are generally provided on the hull.

SUMMARY OF THE INVENTION

The inventor of preferred embodiments of the present invention described and claimed in the present application conducted an extensive study and research regarding outboard motors, such as the one described above, and in doing so, discovered and first recognized new unique challenges and previously unrecognized possibilities for improvements as described in greater detail below.

Batteries such as lead batteries are heavy and relatively large. Therefore, usable space on the hull is liable to be reduced by the provision of the batteries. Particularly in the case of a small-scale watercraft, the movability (e.g., the ability to accelerate and turn) and the fuel efficiency are liable to be influenced by the provision of the batteries.

The inventor of preferred embodiments of the present invention considered the use of a lithium ion capacitor as an engine starting power source. The lithium ion capacitor is small in size and light in weight, and can be incorporated in a watercraft propulsion system such as an outboard motor. This makes it possible to eliminate the batteries from the hull, or to reduce the sizes and the number of the batteries provided on the hull. Thus, the usable space on the hull can be increased. In addition, the movability and the fuel efficiency of the watercraft can be improved.

On the other hand, the lithium ion capacitor has a smaller energy density. Therefore, the lithium ion capacitor is liable to discharge to a level that makes the start of the engine difficult due to standby current and leak current depending on the connection of electrical components provided in the watercraft propulsion system.

In view of this, preferred embodiments of the present invention provide outboard motors, engine starting systems, and watercraft propulsion systems that each utilize a lithium ion capacitor as an engine starting power source and is able to prevent the over-discharge of the lithium ion capacitor.

In order to overcome the previously unrecognized and unsolved challenges described above, a preferred embodiment of the present invention provides an outboard motor to be attached to a hull to generate a propulsive force. The outboard motor includes an engine, a propeller to generate a propulsive force by the drive force of the engine, a lithium ion capacitor, a starter motor to be actuated by power supply from the lithium ion capacitor to crank the engine, a starter relay provided on a starting power supply line between the lithium ion capacitor and the starter motor, a start switch to be turned on by an engine starting operation by a user to energize the coil of the starter relay from the lithium ion capacitor so as to turn on the starter relay, and a charging controller including a switch to connect the lithium ion capacitor to a charging power source to charge the lithium ion capacitor during the driving of the engine, and to disconnect the lithium ion capacitor from the charging power source when the driving of the engine is stopped.

With this arrangement, when the user operates the start switch to turn on the start switch, the coil of the starter relay is energized from the lithium ion capacitor to turn on the starter relay. Then, power is supplied to the starter motor from the lithium ion capacitor via the starting power supply line, such that the cranking of the engine is started. Thus, the engine can be started. Upon the completion of the engine start, the user stops operating the start switch so that the coil of the starter relay is no longer energized. During the driving of the engine, on the other hand, the switch connects the lithium ion capacitor to the charging power source. Thus, the lithium ion capacitor is charged. When the driving of the engine is stopped, the switch disconnects the lithium ion capacitor from the charging power source. Therefore, the lithium ion capacitor is brought into an electrically open state when the driving of the engine is stopped. Thus, the over-discharge of the lithium ion capacitor is prevented which may otherwise occur due to a standby current and a leak current.

This makes it possible to utilize the lithium ion capacitor as the starting power source to drive the starter motor and to prevent the over-discharge of the lithium ion capacitor.

As described above, the lithium ion capacitor is lighter in weight and smaller in volume than a battery and, therefore, is able to be incorporated in the outboard motor. Even if the lithium ion capacitor is located outside the outboard motor, i.e., on the hull of the watercraft mounted with the outboard motor, for example, the lithium ion capacitor does not take up much of the space provided on the hull. Since the lithium ion capacitor is much lighter in weight than the battery, the use of the lithium ion capacitor significantly improves the movability (specifically, the ability to accelerate and turn) of the watercraft. Further, the use of the lithium ion capacitor reduces the weight of the watercraft, thus reducing the fuel consumption.

The switch may be a switching diode, a field effect transistor (MOSFET (Metal-Oxide-Semiconductor Field-Effect Transistor) or the like), or a mechanical relay. The switch is operative to be turned on during the driving of the engine, and turned off when the driving of the engine is stopped.

In a preferred embodiment of the present invention, the outboard motor further includes an engine cover to cover at least the engine and the lithium ion capacitor. With this arrangement, the usable space provided on the hull mounted with the outboard motor is increased because the lithium ion capacitor is accommodated in the engine cover. Since the lithium ion capacitor is lighter in weight and smaller in volume than the battery, the lithium ion capacitor is able to be accommodated in the engine cover of the outboard motor, and is less liable to significantly increase the weight of the outboard motor.

In a preferred embodiment of the present invention, the charging power source includes a generator to be driven by the engine, and the generator is provided in the outboard motor. With this arrangement, the lithium ion capacitor is able to be charged by the generator provided in the outboard motor during the driving of the engine.

In a preferred embodiment of the present invention, the charging power source includes a battery that is charged by the generator. With this arrangement, the battery is able to be charged by the generator provided in the outboard motor, and the lithium ion capacitor is able to be charged by a power supply from the generator and/or the battery during the driving of the engine. Since the power is able to be supplied to the starter motor from the lithium ion capacitor, the battery to be used may have a smaller capacity and may be correspondingly lighter in weight and smaller in size. Even if the battery is provided, therefore, the watercraft has excellent movability.

In a preferred embodiment of the present invention, the charging power source is connected to a power supply line through which power is supplied to a fuel supply system operable to supply a fuel to the engine. The outboard motor further includes a main switch to be turned on by a power-on operation by the user. The charging controller is configured or programmed to connect the lithium ion capacitor to the power supply line when the main switch is turned on, and to disconnect the lithium ion capacitor from the power supply line when the driving of the engine is stopped.

With this arrangement, when the user performs the power-on operation to turn on the main switch, the lithium ion capacitor is connected to the power supply line, such that the power is supplied to the fuel supply system from the lithium ion capacitor. When the user thereafter operates the start switch, the starter motor is connected to the lithium ion capacitor, such that the starter motor is driven to crank the engine. Thus, the engine is started. Since the user stops operating the start switch upon the completion of the engine start, the starter motor is disconnected from the lithium ion capacitor. During the driving of the engine, the lithium ion capacitor is charged because the lithium ion capacitor is connected to the charging power source via the power supply line by the charging controller. When the driving of the engine is stopped, the lithium ion capacitor is disconnected from the power supply line by the function of the charging controller. This prevents a leak current from flowing from the lithium ion capacitor to the power supply line.

During the cranking of the engine, the power is supplied to the fuel supply system from the lithium ion capacitor. Therefore, even if the charging power source is the generator driven by the engine, for example, there is no need to perform the power generation with an engine rotation speed that is used for the cranking. Therefore, the generator may be designed so that the power generation is able to be performed with an engine rotation speed to be used after the completion of the engine start.

In a preferred embodiment of the present invention, the charging power source is connected to a power supply line through which power is supplied to a fuel supply system operable to supply a fuel to the engine. The charging controller is configured or programmed to connect the lithium ion capacitor to the power supply line after the completion of the engine start, and to disconnect the lithium ion capacitor from the power supply line when the driving of the engine is stopped.

With this arrangement, the power is supplied to the fuel supply system from the charging power source. Therefore, when the engine is started, the starter motor is driven by the power supplied from the lithium ion capacitor, and the fuel supply system is driven by the power supplied from the charging power source. Thus, the engine is started. Even after the start of the engine, the charging power source supplies the power to the fuel supply system to continue the driving of the engine. After the completion of the engine start, the lithium ion capacitor is connected to the power supply line, such that the charging of the lithium ion capacitor is started. When the driving of the engine is stopped, the lithium ion capacitor is disconnected from the power supply line, such that the lithium ion capacitor is prevented from discharging via the power supply line.

Where the charging power source is the generator driven by the engine, the generator is preferably configured so that the power generation is able to be performed with an engine rotation speed to be used when the engine is cranked by the starter motor.

When the engine starts rotating at a higher speed after the completion of the engine start, the voltage generated by the generator is elevated. Therefore, the switch may be configured so as to be turned on in response to a voltage outputted to the power supply line. For example, a switching diode having a forward direction that coincides with a direction from the power supply line to the lithium ion capacitor may be used as the switch.

Another preferred embodiment of the present invention provides an engine starting system to start an engine. The engine starting system includes a lithium ion capacitor, a starter motor to be actuated by a power supply from the lithium ion capacitor to crank the engine, a starter relay provided on a starting power supply line between the lithium ion capacitor and the starter motor, a start switch to be turned on by an engine starting operation by a user to energize the coil of the starter relay from the lithium ion capacitor so as to turn on the starter relay, and a charging controller including a switch to connect the lithium ion capacitor to a charging power source to charge the lithium ion capacitor during the driving of the engine, and to disconnect the lithium ion capacitor from the charging power source when the driving of the engine is stopped.

In a preferred embodiment of the present invention, the charging power source includes a generator to be driven by the engine.

In a preferred embodiment of the present invention, the charging power source includes a battery to be charged by the generator.

In a preferred embodiment of the present invention, the charging power source is connected to a power supply line through which power is supplied to a fuel supply system operable to supply a fuel to the engine. The engine starting system further includes a main switch to be turned on by a power-on operation by the user. The charging controller is configured or programmed to connect the lithium ion capacitor to the power supply line when the main switch is turned on, and to disconnect the lithium ion capacitor from the power supply line when the driving of the engine is stopped.

In a preferred embodiment of the present invention, the charging power source is connected to a power supply line through which power is supplied to a fuel supply system that supplies a fuel to the engine. The charging controller connects the lithium ion capacitor to the power supply line after the completion of the engine start, and disconnects the lithium ion capacitor from the power supply line when the driving of the engine is stopped.

In a preferred embodiment of the present invention, the engine is a drive source of a watercraft propulsion system.

In a preferred embodiment of the present invention, the lithium ion capacitor is provided in the watercraft propulsion system.

Another further preferred embodiment of the present invention provides a watercraft propulsion system including an engine, a propeller to generate a propulsive force by the drive force of the engine, and an engine starting system including any of the above-described features.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
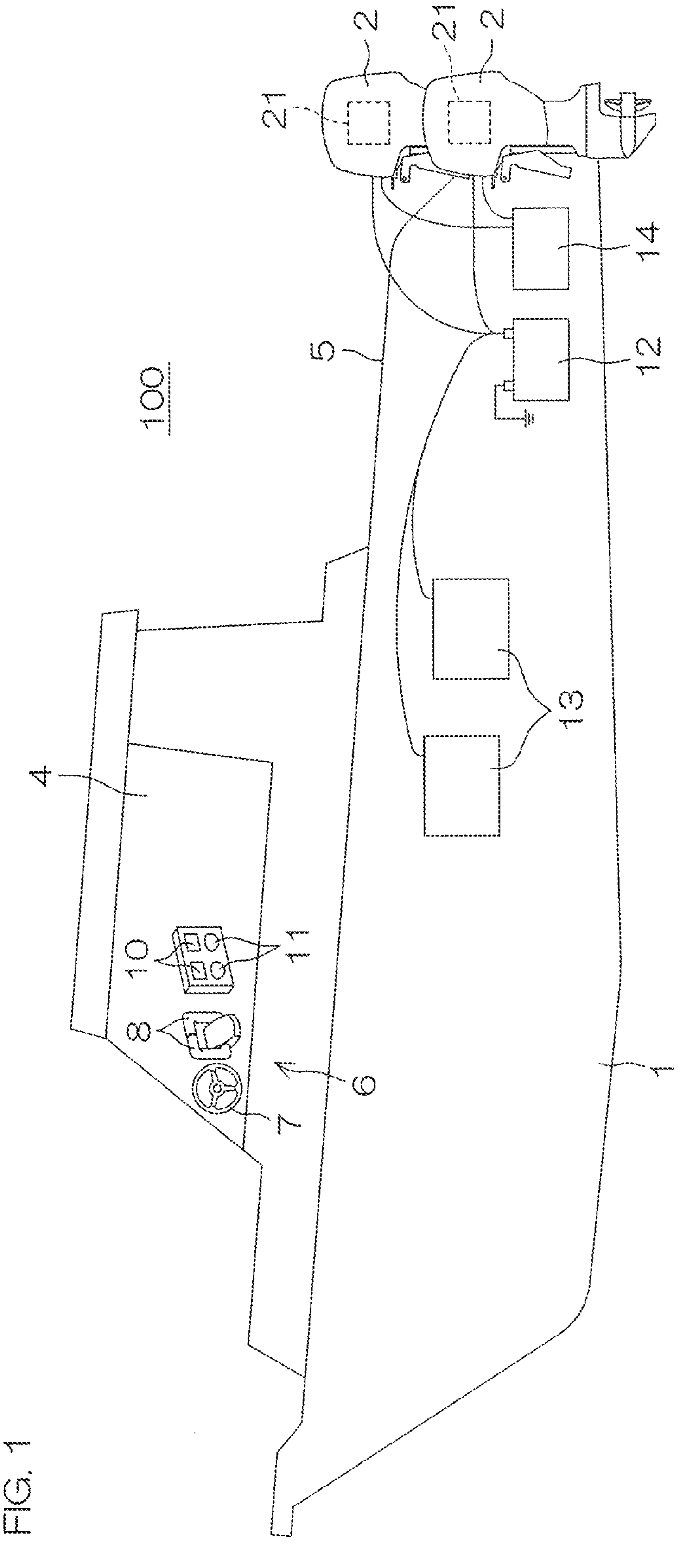
FIG. 1 is a schematic side view showing an exemplary structure of a watercraft including outboard motors according to a preferred embodiment of the present invention.

FIG. 1 is a schematic side view showing the structure of a watercraft (an outboard motor watercraft) including outboard motors according to a preferred embodiment of the present invention by way of example. The watercraft 100 includes a hull 1, and outboard motors 2 provided as an example of the watercraft propulsion system on the hull 1. In this example, two outboard motors 2 are attached to the stern of the hull 1, and disposed side by side transversely of the hull 1.

The hull 1 includes a cabin 4 defined by an outer shell to provide a living area, and a deck 5 disposed behind the cabin 4 to provide open usable space. A watercraft maneuvering station 6 is provided in the cabin 4. In the present preferred embodiment, a steering wheel 7 and acceleration levers 8 are provided in the watercraft maneuvering station 6. The steering wheel 7 is an operation element to steer the watercraft 100. The outboard motors 2 are turned leftward and rightward in response to the operation of the steering wheel 7 to change the directions of propulsive forces to be applied to the hull 1 leftward and rightward. The acceleration levers 8 are operation elements to adjust a propulsive force. By operating the acceleration levers 8, the shift positions of the outboard motors 2 are able to be each shifted to a forward shift position, a neutral shift position, or a reverse shift position, and the magnitudes of the propulsive forces to be generated by the outboard motors 2 are able to be adjusted.

In the present preferred embodiment, the outboard motors 2 are engine outboard motors each including an engine 21 to generate the propulsive force by the driving force of the engine 21. By operating the acceleration levers 8, the throttle opening degrees of the engines 21 are changed to correspondingly change the rotation speeds of the engines 21.

In the watercraft maneuvering station 6, main switches 10 to be operated by a user for the power-on of the outboard motors 2 are provided for the respective outboard motors 2. Further, start switches 11 to be operated by the user to start the engines 21 of the respective outboard motors 2 are provided for the respective outboard motors 2 in the watercraft maneuvering station 6. The main switches 10 and the start switches 11 may each include a rotation type operation element to be operated to turn on and off the main switch or turn on and off the start switch depending on the rotational position of the operation element.

As required, one or more batteries 12 may be provided on the hull 1. The batteries 12 mainly supply power to electrical apparatuses 13 (electrical loads) provided on the hull 1. The electrical apparatuses 13 may include nautical systems typified by a navigation system or a fish finder. Further, the electrical apparatuses 13 may include home electrical appliances such as a refrigerator, a microwave oven, and an air conditioner.

A fuel for the outboard motors 2 is typically stored in a fuel tank 14 provided on the hull 1, and supplied to the outboard motors 2 from the fuel tank 14.

Figure 2:
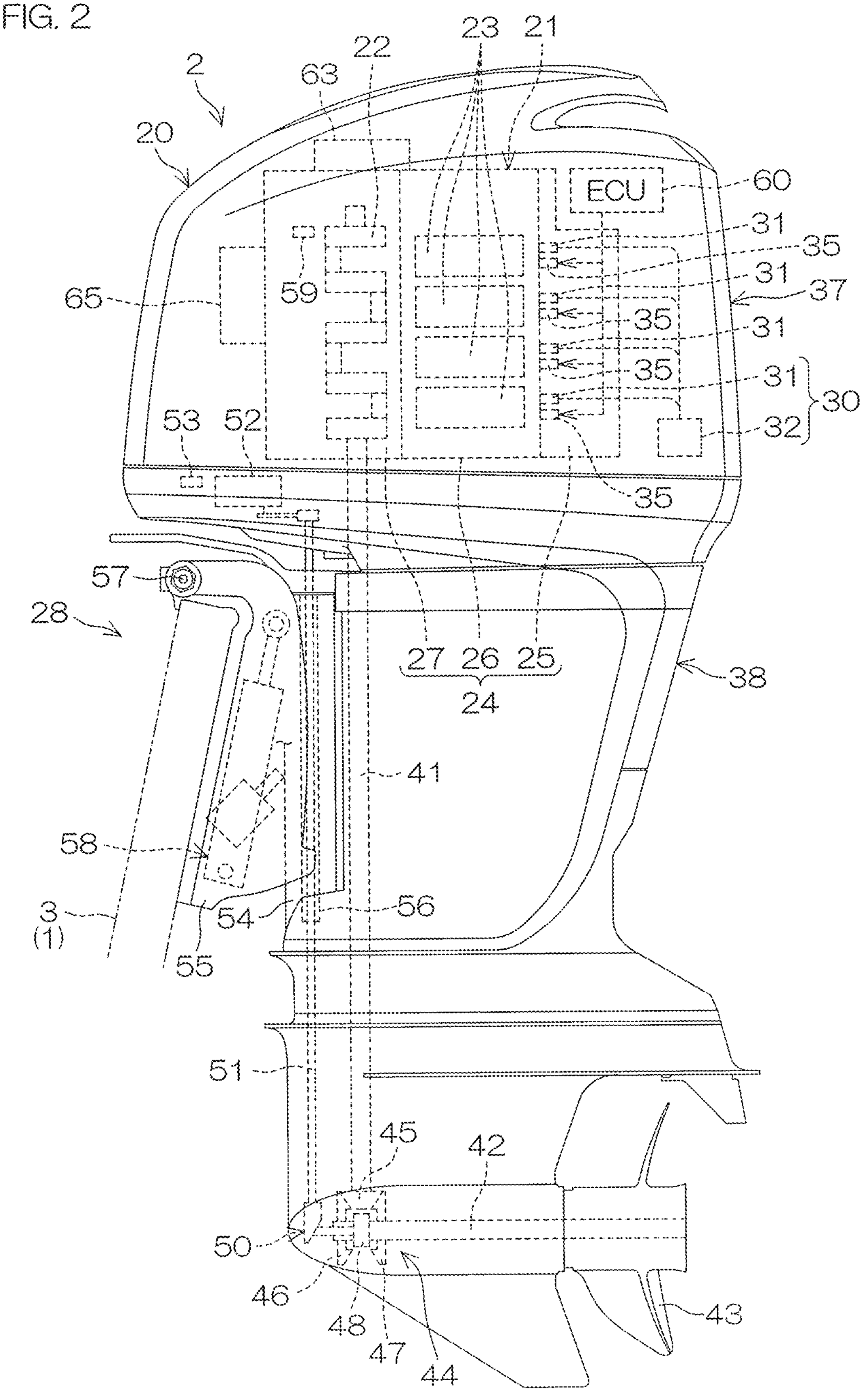
FIG. 2 is a schematic side view showing the structure of an outboard motor by way of example.

FIG. 2 is a schematic side view showing the structure of the outboard motor 2 by way of example. The outboard motor 2 is an engine outboard motor including the engine 21 (internal combustion engine) as its drive source. The outboard motor 2 includes an outboard motor body 20 and an attachment mechanism 28. The outboard motor body 20 is attached to the stern of the hull 1 by the attachment mechanism 28. The attachment mechanism 28 includes a swivel bracket 54, a pair of clamp brackets 55, a steering shaft 56, and a tilt shaft 57. The steering shaft 56 extends vertically. The tilt shaft 57 is oriented generally horizontally and extending laterally. The swivel bracket 54 is connected to the outboard motor body 20 via the steering shaft 56. The pair of clamp brackets 55 are laterally spaced apart. The clamp brackets 55 clamp an attachment plate 3 provided on the stern of the hull 1, and serve as fastening members to fasten the outboard motor body 20 to the hull 1.

The outboard motor body 20 is attached in a generally vertical attitude to the hull 1 by the attachment mechanism 28. The outboard motor body 20 and the swivel bracket 54 are able to pivot about the tilt shaft 57 up and down with respect to the clamp brackets 55. The outboard motor body 20 and the swivel bracket 54 are pivoted about the tilt shaft 57 up and down by a tilt/trim mechanism 58. Further, the outboard motor body 20 is able to pivot about the steering shaft 56 leftward and rightward with respect to the swivel bracket 54. The outboard motor body 20 is pivoted about the steering shaft 56 according to the operation of the steering wheel 7 to steer the watercraft 100.

The outboard motor body 20 includes the engine 21, a drive shaft 41, a propeller shaft 42, a propeller 43, a forward/reverse switching mechanism 44, and an ECU (electronic control unit) 60. The outboard motor body 20 further includes an ISG (Integrated Starter Generator, motor generator) 63, and a lithium ion capacitor 65. The outboard motor body 20 includes an engine cover 37 and a casing 38. The engine 21, the ECU 60, and the ISG 63 are accommodated in the engine cover 37. In the present preferred embodiment, the lithium ion capacitor 65 is also accommodated in the engine cover 37.

The engine 21 is disposed with its crank shaft 22 extending vertically. The drive shaft 41 is connected to the crank shaft 22. The drive shaft 41 extends vertically in the engine cover 37 and the casing 38. The propeller shaft 42 extends horizontally (anteroposteriorly) in the casing 38. The upper end of the drive shaft 41 is connected to the crank shaft 22, and the lower end of the drive shaft 41 is connected to the propeller shaft 42 via the forward/reverse switching mechanism 44 in a power transmittable manner. The forward/reverse switching mechanism 44 is a transmission mechanism that transmits the rotation of the drive shaft 41 to the propeller shaft 42. The propeller 43 is connected to the rear end of the propeller shaft 42. Therefore, the propeller 43 is rotated together with the propeller shaft 42. The power of the engine 21 is transmitted to the propeller 43 via the drive shaft 41, the forward/reverse switching mechanism 44, and the propeller shaft 42 to rotate the propeller 43.

The forward/reverse switching mechanism 44 includes a driving gear 45, a forward gear 46, a reverse gear 47, a dog clutch 48, and a shift mechanism 50. The driving gear 45, the forward gear 46, and the reverse gear 47 are bevel gears. The driving gear 45 is fixed to the lower end of the drive shaft 41. The forward gear 46 and the reverse gear 47 are provided around the front end portion of the propeller shaft 42, and the propeller shaft 42 extends through the forward gear 46 and the reverse gear 47. The forward gear 46 and the reverse gear 47 are rotatable with respect to the propeller shaft 42. The forward gear 46 and the reverse gear 47 are constantly engaged with the driving gear 45. By rotating the driving gear 45, the forward gear 46, and the reverse gear 47 are rotated in opposite directions on the propeller shaft 42.

The forward gear 46 and the reverse gear 47 are spaced from each other axially along the propeller shaft 42, and the dog clutch 48 is disposed between the forward gear 46 and the reverse gear 47. The dog clutch 48 is a slider which is spline-connected to the propeller shaft 42 to be rotatable together with the propeller shaft 42 and anteroposteriorly slidable axially along the propeller shaft 42. The dog clutch 48 is moved anteroposteriorly axially along the propeller shaft 42 by the shift mechanism 50. The shift mechanism 50 includes, for example, a shift rod 51 extending vertically, a shift actuator 52 connected to the upper end of the shift rod 51, and a shift position sensor 53 that detects the position of the dog clutch 48 as the shift position. The shift actuator 52 operates according to the operation of the acceleration lever 8 (see FIG. 1). The shift rod 51 is pivoted by the shift actuator 52, such that the dog clutch 48 is moved axially along the propeller shaft 42. Thus, the dog clutch 48 is located at one of the forward shift position, the reverse shift position, and the neutral shift position. At the forward shift position, the dog clutch 48 is meshed with the forward gear 46, such that the propeller shaft 42 and the propeller 43 are rotated in a forward drive direction. At the reverse shift position, the dog clutch 48 is meshed with the reverse gear 47, such that the propeller shaft 42 and the propeller 43 are rotated in a reverse drive direction. At the neutral shift position, the dog clutch 48 is meshed with neither the forward gear 46 nor the reverse gear 47, such that the power is not transmitted between the drive shaft 41 and the propeller shaft 42.

The engine 21 is an internal combustion engine that generates the power by combustion of the fuel. The engine 21 includes the crank shaft 22, a plurality of cylinders 23 (e.g., four cylinders 23), and a cylinder block 24 accommodating the crank shaft 22 and the cylinders 23. The cylinder block 24 includes a cylinder head 25, a cylinder body 26, and a crank case 27. The crank shaft 22 is rotated about its vertical axis by the combustion in the cylinders 23. The rotation speed of the crank shaft 22 (engine rotation speed) is detected by an engine rotation speed sensor 59. The engine rotation speed sensor 59 may be a crank angle sensor that outputs a detection signal (crank pulse) in synchronism with the rotation of the crank shaft 22, and the ECU 60 may process the output signal to detect the engine rotation speed.

The engine 21 includes a plurality of ignition plugs 35 provided for the respective cylinders 23, and a plurality of ignition coils (not shown) provided for the respective ignition plugs 35. The engine 21 further includes a plurality of fuel injectors 31 provided for the respective cylinders 23. The engine 21 further includes a fuel pump 32 that supplies the fuel to the fuel injectors 31. The fuel injectors 31 and the fuel pump 32 constitute a fuel supply system 30. The fuel pump 32 pumps up the fuel from the fuel tank 14 disposed on the hull 1 to supply the fuel to the fuel injectors 31. The ECU 60 performs an ignition control operation to cause the ignition plugs 35 to spark at proper timings, and performs a fuel injection control operation to inject a proper amount of the fuel from the fuel injectors 31 at proper timings.

Figure 3A:
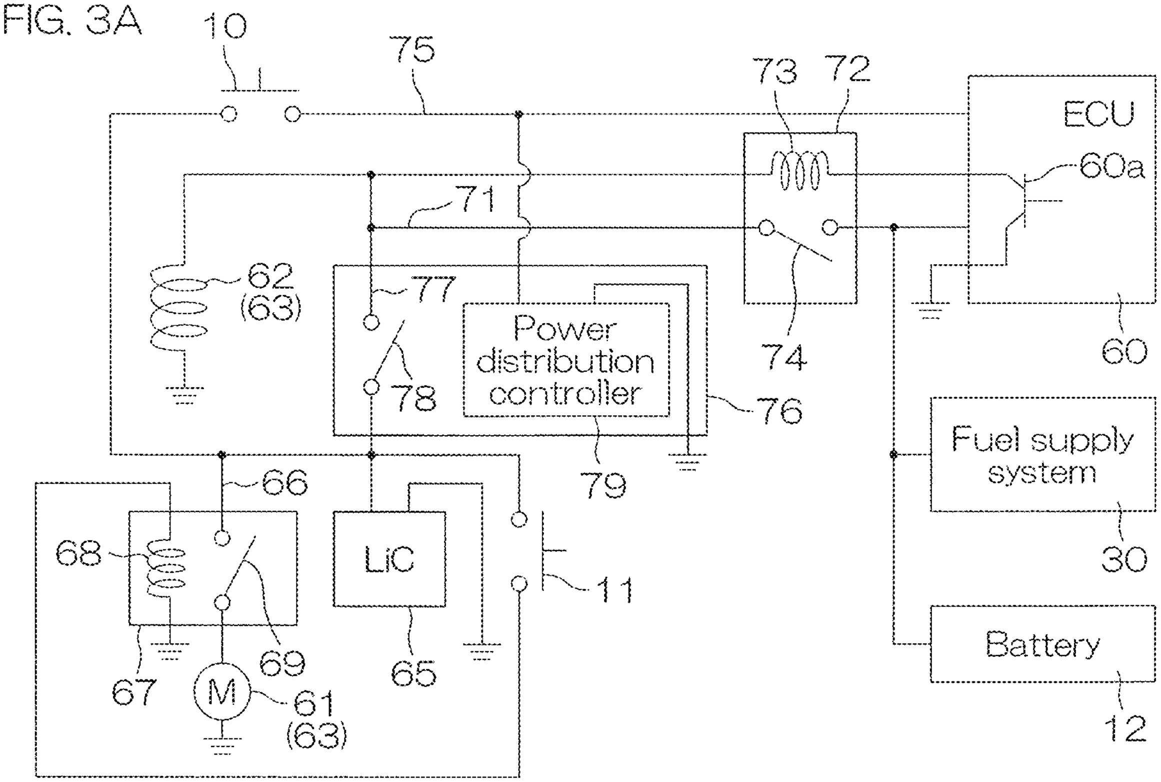
FIG. 3A is a block diagram showing an exemplary structure of an engine starting system that starts an engine of the outboard motor.
Figure 3B:
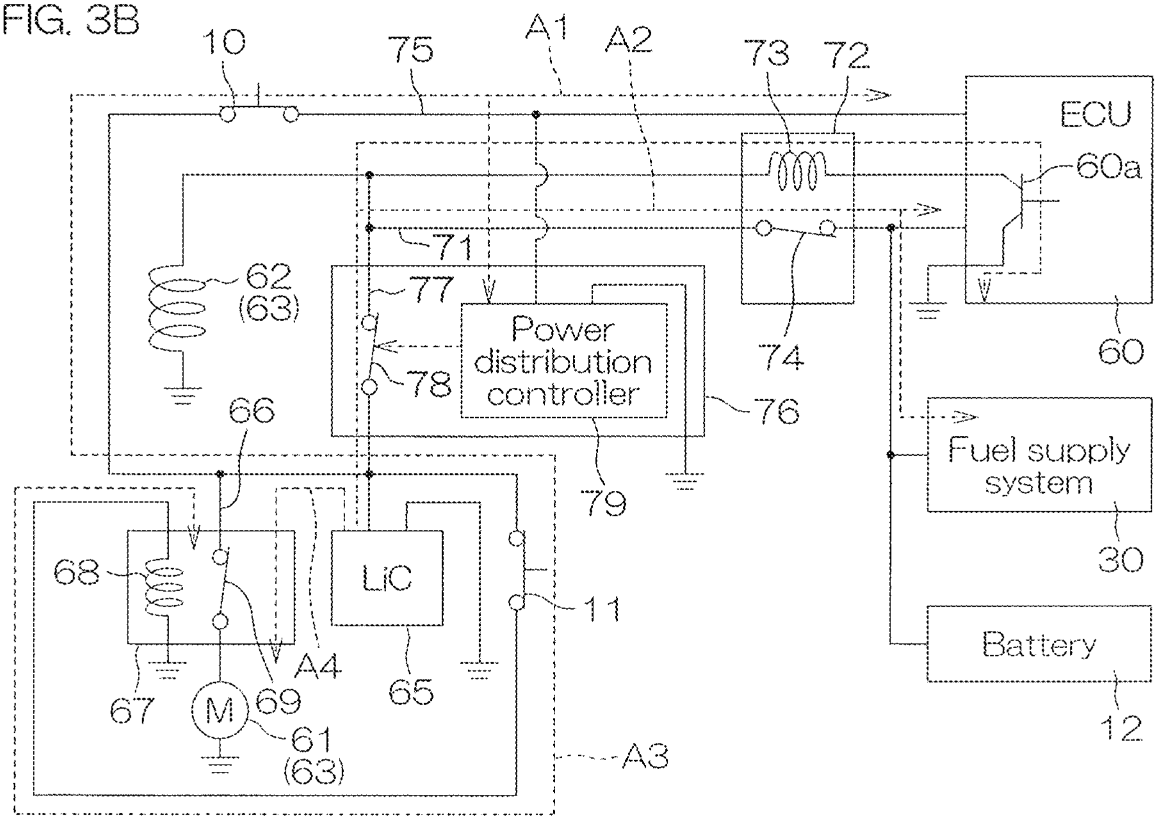
FIGS. 3B and 3C are block diagrams showing the operation of the engine starting system of FIG. 3A by way of example.
Figure 3C:
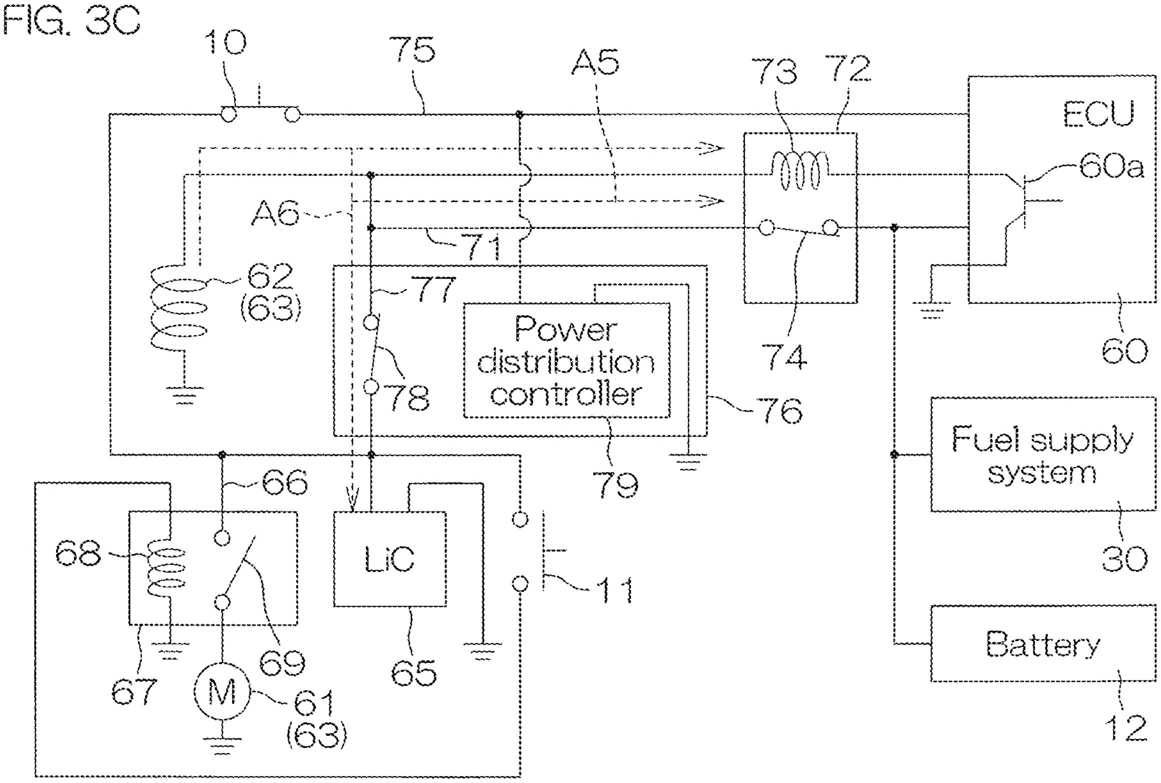

FIGS. 3A to 3C show the electrical configuration of the engine starting system which starts the engine 21 of the outboard motor 2. The ISG 63 is connected to the crank shaft 22 (see FIG. 2) of the engine 21, and functions as a starter motor 61 that cranks the engine 21 and as an AC generator 62 (an example of the generator) that generates power by the rotation of the engine 21 (more exactly, the rotation of the crank shaft 22).

The starter motor 61 is connected to the lithium ion capacitor 65 (illustrated as "LiC" in FIGS. 3A to 3C) via a starting power supply line 66. A starter relay 67 is provided on the starting power supply line 66 between the starter motor 61 and the lithium ion capacitor 65. The coil 68 of the starter relay 67 is connected to the lithium ion capacitor 65 via the start switch 11. Therefore, when the user operates the start switch 11 to turn on the start switch 11, the coil 68 of the starter relay 67 is magnetized to close the contact 69 of the starter relay 67, such that power is supplied to the starter motor 61 from the lithium ion capacitor 65. Thus, the starter motor 61 is actuated to start the cranking of the engine 21. The start switch 11 is a momentary switch which is closed when it is operated by the user, and is open when it is not operated by the user. Therefore, the start switch 11 is open to demagnetize the coil 68 of the starter relay 67 when the user removes his or her finger from the start switch 11 after the completion of the start of the engine 21. Thus, the contact 69 of the starter relay 67 is opened, so that the starter relay 67 is separated from the lithium ion capacitor 65.

The AC generator 62 is connected to the ECU 60 and the fuel supply system 30 via a power supply line 71. The ECU 60 controls the components of the outboard motor 2. As described above, the fuel supply system 30 includes the fuel pump 32 and the fuel injectors 31 (see FIG. 2). A main relay 72 is provided on the power supply line 71. On the other hand, the ECU 60 is connected to the lithium ion capacitor 65 via a power supply line 75. The main switch 10 is provided on the power supply line 75. The main switch 10 is operated for power-on and power-off by the user and configured to be correspondingly held in an ON position and an OFF position.

A charging controller 76 is provided to control the charging of the lithium ion capacitor 65 with the power generated by the AC generator 62. The charging controller 76 includes a charging line 77 that connects the power supply line 71 to the lithium ion capacitor 65, a switch device 78 provided on the charging line 77, and a power distribution controller 79 that turns on and off the switch device 78. One end of the charging line 77 is connected to the power supply line 71 between the AC generator 62 and the main relay 72, and the other end of the charging line 77 is connected to the lithium ion capacitor 65. The switch device 78 may be a semiconductor switch of a field effect transistor (MOSFET or the like) or may be a mechanical relay. The switch device 78 may include a plurality of switch devices of the same type or different types connected in parallel. The power distribution controller 79 is connected to the power supply line 75, and serves as a controller that, when the main switch 10 is on, receives the power from the lithium ion capacitor 65 via the power supply line 75 to be operative to turn on and off the switch device 78. The power distribution controller 79 turns on the switch device 78 when the main switch 10 is on and the power is supplied thereto from the power supply line 75, and turns off the switch device 78 when the main switch 10 is off and the power supply is stopped.

The coil 73 of the main relay 72 is connected to the power supply line 71. Therefore, the coil 73 is able to receive a current supply from the AC generator 62. Further, the coil 73 is able to receive a current supply from the lithium ion capacitor 65 via the charging line 77 when the switch device 78 is on.

When the user turns the main switch 10 to the ON position, operating power is supplied to the power distribution controller 79 and the ECU 60 from the lithium ion capacitor 65 via the power supply line 75. In response thereto, the power distribution controller 79 turns on the switch device 78. When the ECU 60 turns on its internal switching device 60*a* (typically, a semiconductor switch) in this state, current is supplied to the main relay 72 from the lithium ion capacitor 65 to magnetize the coil 73 of the main relay 72. Then, the contact 74 of the main relay 72 is closed, such that the AC generator 62 is connected to the ECU 60 and the fuel supply system 30 via the power supply line 71.

When the user turns the main switch 10 to the OFF position, the operating power of the ECU 60 is stopped, such that the switching device 60*a* is turned off to demagnetize the coil 73 of the main relay 72. Thus, the contact 74 is opened, such that the power supply line 71 is cut off.

Next, the operation of the engine starting system will be described.

FIG. 3A shows an initial state in which the main switch 10 is off. When the main switch 10 is off, the operating power is not supplied to the ECU 60, so that the coil 73 of the main relay 72 is demagnetized and the contact 74 of the main relay 72 is open. Further, the power is not supplied to the power distribution controller 79, so that the switch device 78 is off. If the start switch 11 is not operated, the start switch 11 is off, so that the starter relay 67 is open. Therefore, the lithium ion capacitor 65 is in the electrically open state, and is substantially free from the standby current and the leak current.

To start the engine 21, the user operates the main switch 10 to turn the main switch 10 to the ON position as shown in FIG. 3B, and then operates the start switch 11 to cause the engine 21 to crank.

By turning on the main switch 10, as shown by a reference character A1, the operating power is supplied to the power distribution controller 79 and the ECU 60 from the lithium ion capacitor 65 via the main switch 10, such that the power distribution controller 79 turns on the switch device 78 and the ECU 60 turns on the internal switching device 60*a*. Thus, the coil 73 of the main relay 72 is magnetized by the current supplied from the lithium ion capacitor 65. Thus, the main relay 72 is turned on, so that the operating power is supplied to the fuel supply system 30 from the lithium ion capacitor 65 via the charging line 77 and the power supply line 71 as shown by a reference character A2.

When the start switch 11 is operated to be turned on, the coil 68 of the starter relay 67 is magnetized to turn on the contact 69 of the starter relay 67 by the current from the lithium ion capacitor 65 as shown by a reference character A3. Thus, the power is supplied to the starter motor 61 from the lithium ion capacitor 65 via the starting power supply line 66 as shown by a reference character A4, such that the starter motor 61 is driven to crank the engine 21.

By thus cranking the engine 21 while operating the fuel supply system 30, the engine 21 is started. Upon the completion of the start of the engine 21, the user stops operating the start switch 11. Therefore, as shown in FIG. 3C, the start switch 11 is turned off, such that the starter relay 67 is demagnetized. Since the power is no longer supplied to the starter motor 61 from the lithium ion capacitor 65, the driving of the starter motor 61 is stopped.

When the AC generator 62 starts generating the power upon the completion of the start of the engine 21, as shown by a reference character A5, the power is supplied to the ECU 60 and the fuel supply system 30 from the power supply line 71. In addition, as shown by a reference character A6, the power generated by the AC generator 62 is supplied to the lithium ion capacitor 65 from the power supply line 71 via the switch device 78 and the charging line 77 to charge the lithium ion capacitor 65. Therefore, the lithium ion capacitor 65 is substantially free from discharge during the driving of the engine 21.

In the present preferred embodiment, the AC generator 62 is an example of the charging power source that charges the lithium ion capacitor 65. In the present preferred embodiment, the lithium ion capacitor 65 is connected to the battery 12 via the charging line 77 and the power supply line 71 during the driving of the engine 21 and, therefore, is also able to be charged by the power from the battery 12. That is, the battery 12 is another example of the charging power source.

To stop the engine 21, the user operates the main switch 10 to the OFF position, such that the main switch 10 is opened. Therefore, the operating power is not supplied to the power distribution controller 79, so that the switch device 78 is opened. Further, without the power supply to the ECU 60 from the power supply line 75, the ECU 60 turns off the switching device 60*a* to demagnetize the coil 73 of the main relay 72. Thus, the contact 74 of the main relay 72 is opened back to the state shown in FIG. 3A, such that the power supply to the ECU 60 and the fuel supply system 30 is turned off. Thus, the engine 21 is stopped. Since both the main switch 10 and the switch device 78 are turned off, the lithium ion capacitor 65 is substantially free from paths for the standby current and the leak current.

Where the battery 12 such as a lead battery is mounted on the hull 1, the battery 12 is connected to the power supply line 71 at a location between the ECU 60 and the main relay 72. Therefore, the battery 12 is charged by the power generated by the AC generator 62 during the driving of the engine 21. As described above, the electrical apparatuses 13 (see FIG. 1) provided on the hull 1 are connected to the battery 12. If the main switch 10 is turned off and the switch device 78 is turned off, there is no current path between the lithium ion capacitor 65 and the battery 12. Therefore, the power of the lithium ion capacitor 65 is not consumed by the electrical apparatuses 13 during stopping of the engine 21.

In the present preferred embodiment, as described above, the engine 21 is able to be started by supplying the power to the starter motor 61 from the lithium ion capacitor 65. Upon the start of the engine 21, the start switch 11 is turned off, such that the starter relay 67 is turned off to disconnect the lithium ion capacitor 65 from the starter motor 61. Upon the completion of the start of the engine 21, the lithium ion capacitor 65 is able to be charged by the power generated by the AC generator 62. When the main switch 10 is turned off to stop the engine 21, the switch device 78 is turned off, such that the lithium ion capacitor 65 is disconnected from the power supply line 71. Since the lithium ion capacitor 65 is brought into the electrically open state, the over-discharge of the lithium ion capacitor 65 can be prevented which may otherwise occur due to the standby current and the leak current. Thus, the lithium ion capacitor 65 can be used as the starting power source for the driving of the starter motor 61, and the over-discharge of the lithium ion capacitor 65 can be prevented.

The lithium ion capacitor 65 is light in weight and small in volume and, therefore, is accommodated in the engine cover 37 to be incorporated in the outboard motor 2 in the present preferred embodiment. Thus, more usable space is provided on the hull 1. In the present preferred embodiment, the batteries 12 are provided on the hull 1 as the power source for the electrical apparatuses 13 to be used on the watercraft, but there is no need to provide starter batteries 12 for the start of the engines 21 of the outboard motors 2. Therefore, a smaller number of batteries 12 each having a smaller size may be provided on the hull 1. In the present preferred embodiment, the batteries 12 provided on the hull 1 are able to be charged by the AC generators 62 of the outboard motors 2. For this reason, a smaller number of batteries 12 each having a smaller capacity may be provided on the hull 1. Therefore, more usable space is provided on the hull 1. Since a smaller number of batteries 12 each having a smaller size can be provided on the hull 1, the weight of the watercraft 100 can be advantageously reduced. This improves the movability (e.g., the ability to accelerate and turn) of the watercraft 100. The reduction in the weight of the watercraft 100 makes it possible to reduce the fuel consumption of the watercraft 100.

In the present preferred embodiment, the power is supplied to the fuel supply system 30 from the lithium ion capacitor 65 to start the engine, and is not dependent on the power generated by the AC generator 62. Therefore, the AC generator 62 need not be designed to be able to generate the power with a lower rotation speed used for cranking, but may be designed to be able to generate the power with an engine rotation speed used after the completion of the engine start.

Figure 4:
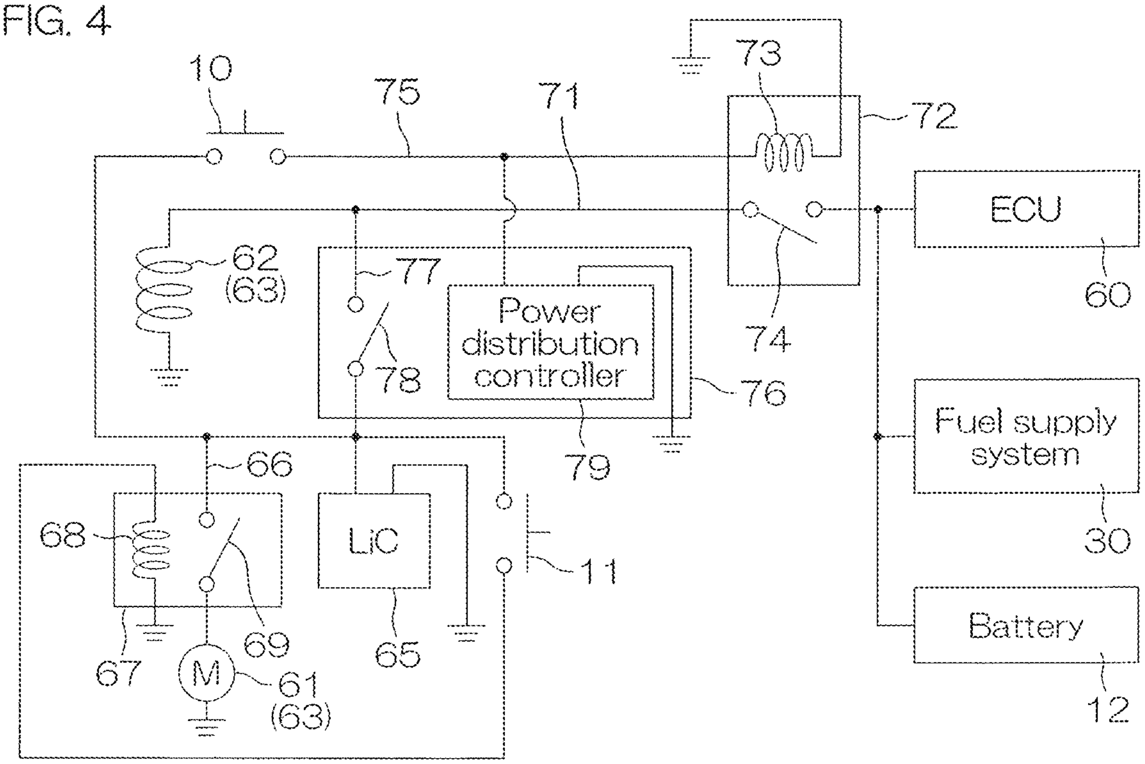
FIG. 4 is a block diagram showing another exemplary structure of the engine starting system.

FIG. 4 shows another exemplary structure of the engine starting system. In FIG. 4, components corresponding to those shown in FIGS. 3A to 3C will be denoted by the same reference characters as in FIGS. 3A to 3C. In the structure shown in FIGS. 3A to 3C, the ECU 60 controls the ON/OFF of the main relay 72, but the ON/OFF control by the ECU 60 is obviated in the exemplary structure shown in FIG. 4.

Specifically, the coil 73 of the main relay 72 is constantly connected to a ground line. Therefore, when the main switch 10 is turned on, the current is supplied to the coil 73 of the main relay 72 from the lithium ion capacitor 65 via the power supply line 75 without the need for the control by the ECU 60, such that the coil 73 is magnetized to turn on the contact 74 of the main relay 72. Thus, the operating power is supplied to the ECU 60 and the fuel supply system 30 from the lithium ion capacitor 65 via the power supply line 71. Therefore, the user can start the engine 21 by operating the start switch 11.

When the user turns off the main switch 10 to stop the driving of the engine 21, the current to the coil 73 of the main relay 72 is turned off and, therefore, the contact 74 of the main relay 72 is opened. Thus, the power supply to the ECU 60 and the fuel supply system 30 is turned off.

The other operations are performed in substantially the same manner as in FIGS. 3A to 3C.

Figure 5A:
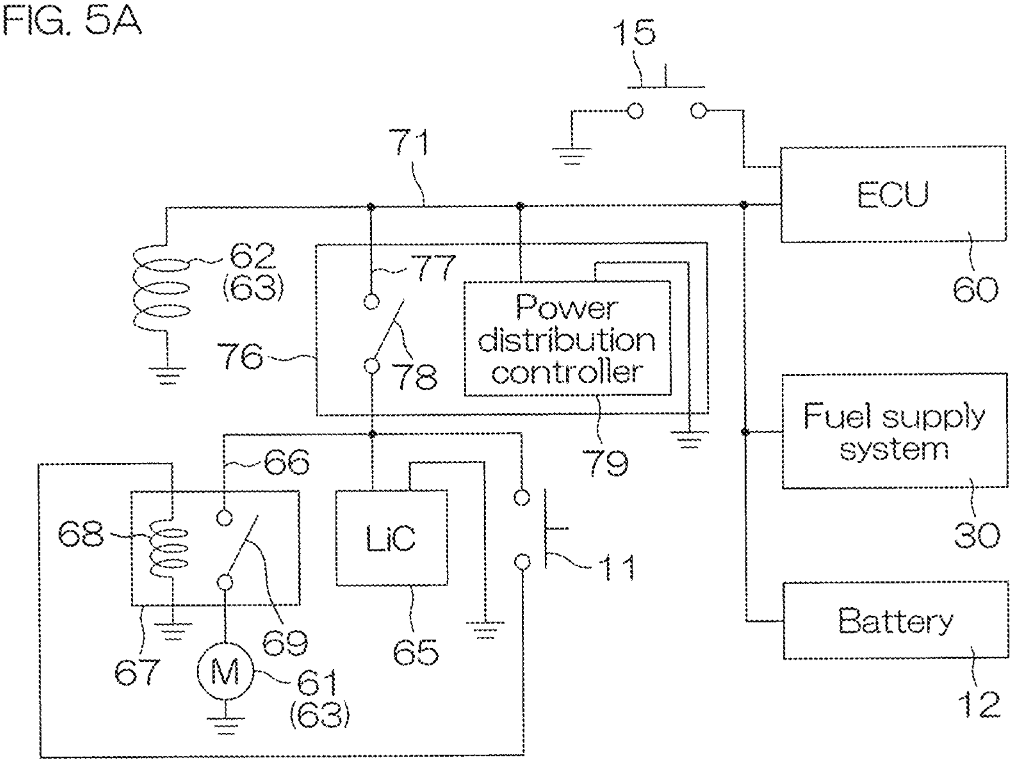
FIG. 5A is a block diagram showing another further exemplary structure of the engine starting system.
Figure 5B:
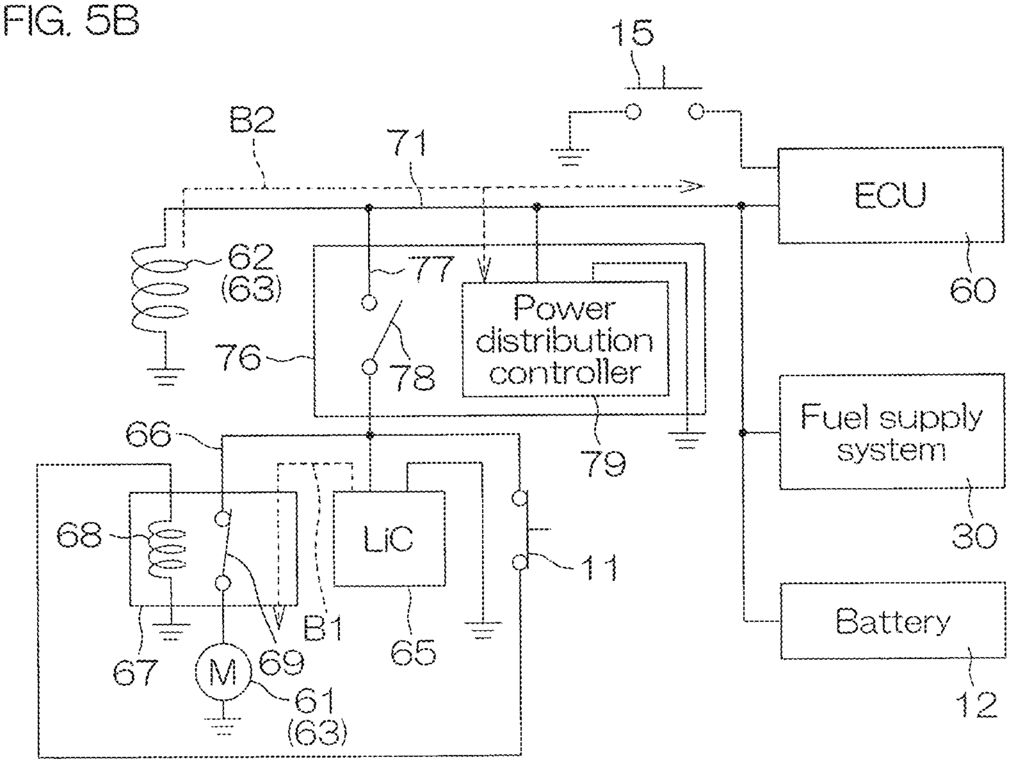
FIGS. 5B and 5C are block diagrams showing the operation of the engine starting system of FIG. 5A by way of example.
Figure 5C:
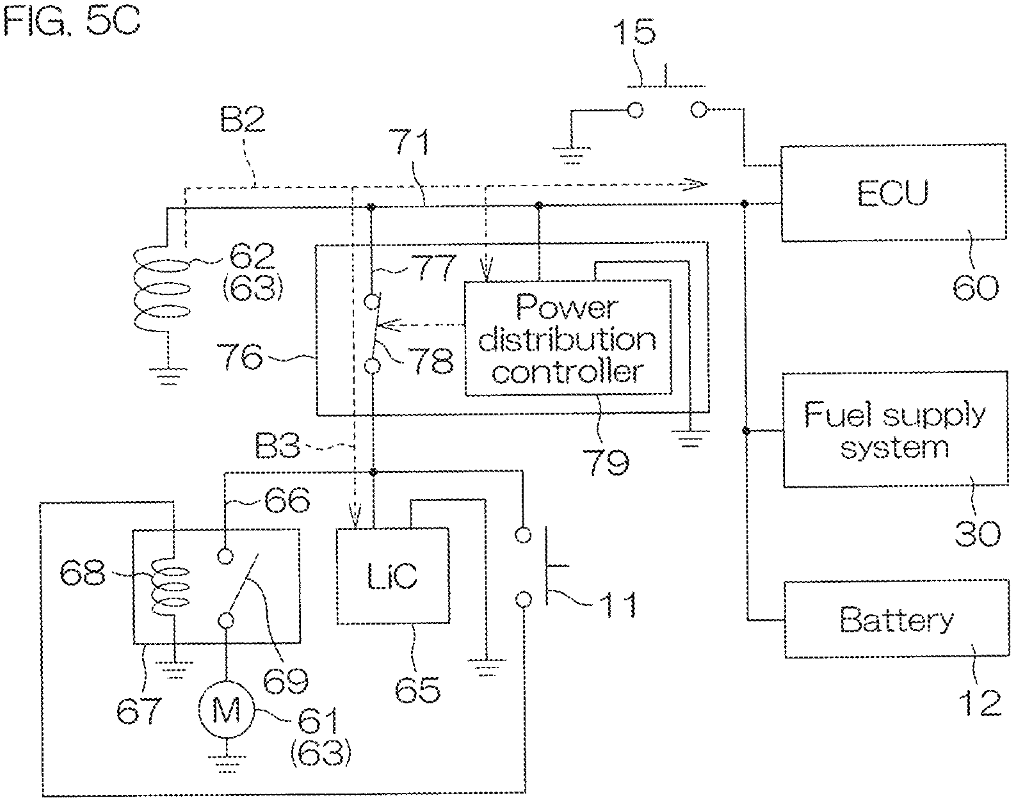

FIGS. 5A to 5C show further another exemplary structure of the engine starting system. In FIGS. 5A to 5C, components corresponding to those shown in FIGS. 3A to 3C will be denoted by the same reference characters as in FIGS. 3A to 3C.

In this exemplary structure, neither the main switch 10 nor the main relay 72 are provided. Where the outboard motor 2 is configured to be steered by operating a tiller handle connected to the outboard motor body 20 by the user, for example, the main switch is often obviated and, thus, the main relay is obviated. Alternatively, a stop switch 15 is provided, which is operated by the user to stop the engine 21.

The starter motor 61 is connected to the lithium ion capacitor 65 via the starting power supply line 66. The starter relay 67 is provided on the starting power supply line 66 between the starter motor 61 and the lithium ion capacitor 65. The coil 68 of the starter relay 67 is connected to the lithium ion capacitor 65 via the start switch 11. Therefore, when the start switch 11 is operated to be turned on by the user, the coil 68 of the starter relay 67 is magnetized to close the contact 69 of the starter relay 67. Then, the power is supplied to the starter motor 61 from the lithium ion capacitor 65, such that the starter motor 61 is actuated to start the cranking of the engine 21. The start switch 11 is a momentary switch which is closed when it is operated by the user, and is open when it is not operated by the user. Therefore, the start switch 11 is opened to demagnetize the coil 68 of the starter relay 67 when the user removes his or her finger from the start switch 11 after the completion of the start of the engine 21. Thus, the contact 69 of the starter relay 67 is open, so that the starter relay 67 is separated from the lithium ion capacitor 65.

The AC generator 62 is connected to the ECU 60 and the fuel supply system 30 via the power supply line 71. The fuel supply system 30 includes the fuel pump 32 and the fuel injectors 31 (see FIG. 2). Unlike the structure shown in FIGS. 3A to 3C, no main relay is provided on the power supply line 71. In this exemplary structure, the AC generator 62 is designed so as to be able to generate the power with an engine rotation speed within a lower speed range including the rotation speed used for cranking. The power generated by the AC generator 62 is used as the power required for the start (cranking) of the engine by the fuel supply system 30.

The charging controller 76 is provided in order to control the charging of the lithium ion capacitor 65 with the power generated by the AC generator 62. The charging controller 76 includes the charging line 77 that connects the power supply line 71 to the lithium ion capacitor 65, the switch device 78 provided on the charging line 77, and the power distribution controller 79 that controls the ON/OFF of the switch device 78. One end of the charging line 77 is connected to the power supply line 71, and the other end of the charging line 77 is connected to the lithium ion capacitor 65. The switch device 78 may be a semiconductor switch of a field effect transistor (MOSFET or the like) or may be a mechanical relay. The switch device 78 may include switch devices of the same type or different types connected in parallel. The power distribution controller 79 is a controller that receives the power supply from the power supply line 71 to be operative to turn on and off the switch device 78. The power distribution controller 79 is operable to turn on the switch device 78 when the power generated by the AC generator 62 is supplied thereto. The power distribution controller 79 turns off the switch device 78 when the power generation by the AC generator 62 is stopped by stopping the engine to thus stop the power supply.

The stop switch 15 to be operated by the user to stop the engine 21 is connected to the ECU 60. The ECU 60 controls the fuel supply system 30 to stop supplying the fuel when the stop switch 15 is operated. Thus, the engine 21 is stopped.

Next, the operation of the engine starting system will be described.

Before the start of the engine 21, as shown in FIG. 5A, the start switch 11 and the switch device 78 are off, and the starter relay 67 is open. Therefore, the current paths from the lithium ion capacitor 65 are cut off and, thus, the lithium ion capacitor 65 is substantially free from the standby current and the leak current.

To start the engine 21, the user operates the start switch 11 to turn on the start switch 11 as shown in FIG. 5B. Thus, the coil 68 of the starter relay 67 is magnetized to close the contact 69 of the starter relay 67. Therefore, as shown by a reference character B1, the power is supplied to the starter motor 61 from the lithium ion capacitor 65 to start the cranking of the engine 21. The power generation by the AC generator 62 is started by starting the rotation of the engine 21, such that the power is supplied to the ECU 60 and the fuel supply system 30 via the power supply line 71 as shown by a reference character B2. Thus, the starting control operation (the fuel injection control operation and the ignition control operation) is performed during the cranking of the engine 21. Thus, the engine 21 is started.

Upon the completion of the start of the engine 21, the user stops the operation of the start switch 11 and, therefore, the start switch 11 is turned off as shown in FIG. 5C to demagnetize the starter relay 67. Thus, the power supply to the starter motor 61 from the lithium ion capacitor 65 is stopped, so that the driving of the starter motor 61 is stopped. Therefore, the lithium ion capacitor 65 is substantially free from discharge during the driving of the engine 21.

The power distribution controller 79 is able to receive the power generated by the AC generator 62 via the power supply line 71. When the voltage of the power supply line 71 is sufficiently elevated, as shown in FIG. 5C, the power distribution controller 79 turns on the switch device 78. Thus, as shown by a reference character B3, the lithium ion capacitor 65 is able to be charged by the power generated by the AC generator 62.

To stop the engine 21, the user operates the stop switch 15. In response thereto, the ECU 60 stops the ignition control operation and the fuel injection control operation, such that the engine 21 is stopped. Thus, the power generation by the AC generator 62 is stopped and, thus, the power supply to the power distribution controller 79 is stopped to turn off the switch device 78. Thus, the engine starting system is returned to the state shown in FIG. 5A, so that the lithium ion capacitor 65 is substantially free from the paths for the standby current and the leak current.

Where the battery 12 such as a lead battery is provided on the hull 1, the battery 12 is connected to the power supply line 71. Therefore, the battery 12 is charged with the power generated by the AC generator 62 during the driving of the engine 21. As described above, the electrical apparatuses 13 (see FIG. 1) provided on the hull 1 are connected to the battery 12. When the driving of the engine 21 is stopped, the switch device 78 is turned off, such that the current path between the lithium ion capacitor 65 and the battery 12 is cut off. Therefore, the power of the lithium ion capacitor 65 is not consumed by the electrical apparatuses 13 when the engine is stopped.

Thus, this exemplary structure also provides the same effects as the structure shown in FIGS. 3A to 3C.

The switch device 78 of the charging controller 76 may be a switching diode connected as having a forward direction that coincides with a direction from the power supply line 71 to the lithium ion capacitor 65. In this case, there is no need to provide the power distribution controller 79. When the AC generator 62 is off (typically, when the engine 21 is stopped), the lithium ion capacitor 65 has a higher potential than the power supply line 71 and, therefore, the switching diode is off. When the potential of the power supply line 71 is sufficiently elevated after the AC generator 62 starts generating the power, the switching diode is turned on, such that the lithium ion capacitor 65 is able to be charged with the power generated by the AC generator 62. When the engine 21 is stopped, the power generation by the AC generator 62 is stopped to turn off the switching diode. Therefore, the current paths connected to the lithium ion capacitor 65 are turned off.

While preferred embodiments of the present invention have thus been described, the present invention may be embodied in some other ways. In the preferred embodiments described above, the batteries 12 are provided on the hull 1 by way of example, but may be obviated if the electrical apparatuses 13 are not used on the watercraft. In the preferred embodiments described above, the outboard motors are used as the watercraft propulsion systems by way of example. The present invention is applicable to a watercraft propulsion system of other types using an engine as a drive source. Specifically, the present invention may be applied to an inboard motor, an inboard/outboard motor, a water jet propulsion system or the like. Further, the present invention may be applied to an engine starting operation for a system other than a watercraft propulsion system.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor to be attached to a hull to generate a propulsive force, the outboard motor comprising:
- an engine;
- a propeller to generate a propulsive force by a drive force of the engine;
- a lithium ion capacitor;
- a starter motor to be actuated by a power supply from the lithium ion capacitor to crank the engine;
- a starter relay provided on a starting power supply line between the lithium ion capacitor and the starter motor;
- a start switch to be turned on by an engine starting operation by a user to energize a coil of the starter relay from the lithium ion capacitor so as to turn on the starter relay; and
- a charging controller including a switch to connect the lithium ion capacitor to a charging power source to charge the lithium ion capacitor during driving of the engine, and to disconnect the lithium ion capacitor from the charging power source when the driving of the engine is stopped.

2. The outboard motor according to claim 1, further comprising an engine cover to cover at least the engine and the lithium ion capacitor.

3. The outboard motor according to claim 1, wherein the charging power source includes a generator to be driven by the engine, and the generator is provided in the outboard motor.

4. The outboard motor according to claim 3, wherein the charging power source includes a battery to be charged by the generator.

5. The outboard motor according to claim 1, wherein the charging power source is connected to a power supply line through which power is supplied to a fuel supply system operable to supply a fuel to the engine;

the outboard motor further includes a main switch to be turned on by a power-on operation by the user; and the charging controller is configured or programmed to connect the lithium ion capacitor to the power supply line when the main switch is turned on, and to disconnect the lithium ion capacitor from the power supply line when the driving of the engine is stopped.

6. The outboard motor according to claim 1, wherein the charging power source is connected to a power supply line through which power is supplied to a fuel supply system operable to supply a fuel to the engine; and the charging controller is configured or programmed to connect the lithium ion capacitor to the power supply line after completion of the engine start, and to disconnect the lithium ion capacitor from the power supply line when the driving of the engine is stopped.

7. An engine starting system for starting an engine, the engine starting system comprising:

a lithium ion capacitor;

a starter motor to be actuated by a power supply from the lithium ion capacitor to crank the engine;

a starter relay provided on a starting power supply line between the lithium ion capacitor and the starter motor;

a start switch to be turned on by an engine starting operation by a user to energize a coil of the starter relay from the lithium ion capacitor so as to turn on the starter relay; and a charging controller including a switch to connect the lithium ion capacitor to a charging power source to charge the lithium ion capacitor during driving of the engine, and to disconnect the lithium ion capacitor from the charging power source when the driving of the engine is stopped.

8. The engine starting system according to claim 7, wherein the charging power source includes a generator to be driven by the engine.

9. The engine starting system according to claim 8, wherein the charging power source includes a battery to be charged by the generator.

10. The engine starting system according to claim 7, wherein the charging power source is connected to a power supply line through which power is supplied to a fuel supply system operable to supply a fuel to the engine;

the engine starting system further includes a main switch to be turned on by a power-on operation by the user; and the charging controller is configured or programmed to connect the lithium ion capacitor to the power supply line when the main switch is turned on, and to disconnect the lithium ion capacitor from the power supply line when the driving of the engine is stopped.

11. The engine starting system according to claim 7, wherein the charging power source is connected to a power supply line through which power is supplied to a fuel supply system operable to supply a fuel to the engine;

the charging controller is configured or programmed to connect the lithium ion capacitor to the power supply line after completion of the engine start, and to disconnect the lithium ion capacitor from the power supply line when the driving of the engine is stopped.

12. The engine starting system according to claim 7, wherein the engine is a drive source of a watercraft propulsion system.

13. The engine starting system according to claim 12, wherein the lithium ion capacitor is provided in the watercraft propulsion system.

14. A watercraft propulsion system comprising:

an engine;

a propeller to generate a propulsive force by a drive force of the engine; and the engine starting system according to claim 7.

* * * * *